(12) United States Patent
Lee et al.

(10) Patent No.: US 9,850,161 B2
(45) Date of Patent: Dec. 26, 2017

(54) FLUORIDE GLAZES FROM FLUORINE ION TREATMENT

(71) Applicant: Applied Materials, Inc., Santa Clara, CA (US)

(72) Inventors: Chengtsin Lee, Union City, CA (US); Jennifer Y. Sun, Mountain View, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 15/418,615

(22) Filed: Jan. 27, 2017

(65) Prior Publication Data

US 2017/0283313 A1   Oct. 5, 2017

Related U.S. Application Data

(60) Provisional application No. 62/314,750, filed on Mar. 29, 2016.

(51) Int. Cl.

| C03C 17/22 | (2006.01) |
|---|---|
| C03C 10/00 | (2006.01) |
| C03C 10/16 | (2006.01) |
| C03C 8/06 | (2006.01) |
| C03C 4/18 | (2006.01) |
| C03C 17/245 | (2006.01) |

(52) U.S. Cl.
CPC ............... *C03C 17/22* (2013.01); *C03C 4/18* (2013.01); *C03C 8/06* (2013.01); *C03C 10/00* (2013.01); *C03C 10/16* (2013.01); *C03C 17/245* (2013.01); *C03C 2204/00* (2013.01); *C03C 2209/00* (2013.01); *C03C 2217/214* (2013.01); *C03C 2217/285* (2013.01)

(58) Field of Classification Search
None
See application file for complete search history.

(56) References Cited

U.S. PATENT DOCUMENTS

| 3,384,508 A | 5/1968 | Bopp et al. |
|---|---|---|
| 3,471,307 A | 10/1969 | Rostoker |
| 3,715,196 A | 2/1973 | Montierth |
| 3,951,328 A | 4/1976 | Wallace et al. |
| 4,434,211 A | 2/1984 | Shoher et al. |

(Continued)

FOREIGN PATENT DOCUMENTS

| CN | 101033136 A | 9/2007 |
|---|---|---|
| CN | 103073928 A | 5/2013 |

(Continued)

OTHER PUBLICATIONS

Koji Okuda, et al., "Electrical Joining of Silicon Nitride Ceramics," J. Am. Ceram. Soc., 1993, vol. 76, No. 6, pp. 1459-1465.

(Continued)

*Primary Examiner* — Mandy Louie
(74) *Attorney, Agent, or Firm* — Lowenstein Sandler LLP

(57) ABSTRACT

An article comprises a body having a coating. The coating comprising a mixture of a first oxide and a second oxide. The coating includes a glaze on a surface of the coating, the glaze comprising a eutectic system having a super-lattice of a first fluoride and a second fluoride.

11 Claims, 6 Drawing Sheets

(56) References Cited

U.S. PATENT DOCUMENTS

| | | | |
|---|---|---|---|
| 5,208,101 A * | 5/1993 | Boulos | C03C 17/22 359/580 |
| 5,268,196 A * | 12/1993 | Boulos | C03C 17/22 359/488.01 |
| 5,368,673 A | 11/1994 | Okuda et al. | |
| 5,534,091 A | 7/1996 | Okuda et al. | |
| 5,541,012 A | 7/1996 | Ohwaki et al. | |
| 5,955,388 A | 9/1999 | Dejneka | |
| 6,123,743 A | 9/2000 | Carman et al. | |
| 6,139,983 A | 10/2000 | Ohashi et al. | |
| 6,221,197 B1 | 4/2001 | Mori et al. | |
| 6,284,682 B1 | 9/2001 | Troczynski et al. | |
| 6,316,377 B1 | 11/2001 | Fulton et al. | |
| 6,383,964 B1 | 5/2002 | Nakahara et al. | |
| 6,447,937 B1 | 9/2002 | Murakawa et al. | |
| 6,620,282 B2 | 9/2003 | Mori et al. | |
| 6,776,873 B1 | 8/2004 | Sun et al. | |
| 6,783,875 B2 | 8/2004 | Yamada et al. | |
| 6,789,498 B2 | 9/2004 | Kaushal et al. | |
| 7,208,044 B2 | 4/2007 | Zurbuchen | |
| 7,655,328 B2 | 2/2010 | Maeda et al. | |
| 7,696,117 B2 | 4/2010 | Sun et al. | |
| 7,713,640 B2 | 5/2010 | Zurbuchen | |
| 7,833,924 B2 | 11/2010 | Kobayashi et al. | |
| 7,837,967 B2 | 11/2010 | Aoki et al. | |
| 7,880,444 B2 | 2/2011 | Pellenc | |
| 7,915,189 B2 | 3/2011 | Kobayashi et al. | |
| 8,021,720 B2 | 9/2011 | Szuecs et al. | |
| 8,031,240 B2 | 10/2011 | Yumiki | |
| 8,034,734 B2 | 10/2011 | Sun et al. | |
| 8,163,403 B2 | 4/2012 | Zurbuchen | |
| 8,206,488 B2 | 6/2012 | Mantkowski | |
| 8,354,146 B2 | 1/2013 | Garimella et al. | |
| 8,623,527 B2 | 1/2014 | Sun et al. | |
| 8,858,745 B2 | 10/2014 | Sun et al. | |
| 8,896,210 B2 | 11/2014 | Nishino et al. | |
| 8,961,683 B2 | 2/2015 | Sanada | |
| 9,017,765 B2 | 4/2015 | Sun et al. | |
| 2002/0155940 A1 | 10/2002 | Kobayashi | |
| 2007/0071979 A1 | 3/2007 | Komuro et al. | |
| 2008/0264564 A1 | 10/2008 | Sun et al. | |
| 2008/0264565 A1 | 10/2008 | Sun et al. | |
| 2009/0197135 A1 | 8/2009 | Querel et al. | |
| 2010/0119844 A1 | 5/2010 | Sun et al. | |
| 2010/0129670 A1 | 5/2010 | Sun et al. | |
| 2010/0218787 A1 | 9/2010 | Ladru et al. | |
| 2010/0247930 A1 | 9/2010 | Zurbuchen | |
| 2015/0004418 A1 | 1/2015 | Sun et al. | |
| 2015/0096462 A1 | 4/2015 | Fukagawa et al. | |

FOREIGN PATENT DOCUMENTS

| | | | | |
|---|---|---|---|---|
| CN | 103274765 A | | 9/2013 | |
| EP | 1158072 A2 | | 11/2001 | |
| JP | 2001/351966 | | 12/2001 | |
| JP | 2002192655 | | 7/2002 | |
| JP | 2002293630 | * | 10/2002 | C04B 35/44 |
| WO | 2010/056294 | | 5/2010 | |
| WO | 2010/056338 A2 | | 5/2010 | |

OTHER PUBLICATIONS

Reed, Principles of Ceramics Processing 2nd ed. (c) 1995 by Joh Wiley & Sons, Inc p. 137-142 and p. 172-189.
Ring, Fundamentals of Ceramic powder Processing and Synthesis (c) 1996 Academic Press Inc, p. 609-679.
Aasland, S. et al "Phase equilibria in the binary systems $ZrF_4$—$LaF_3$ and $ZrF_4$—$AlF_3$" J. of Non-Cryst. Solids 140 (1992) 69-72.
Babitsyna et al. "Quaternary Fluorozirconate Glasses Containing Aluminum Trifluoride" Glass Physics and Chemistry, vol.28, No. 6, 2002, pp. 424-432.
Ebata, Y, et al. Electrical Joining of Silicon Nitride Ceramics, Japan Ceramic Society Journal, vol. 97, No. 1, 1989, pp. 88-90.

* cited by examiner

FLUORIDE GLAZES FROM FLUORINE ION TREATMENT

RELATED APPLICATIONS

This patent application claims the benefit under 35 U.S.C. §119(e) of U.S. Provisional Application No. 62/314,750, filed Mar. 29, 2016, which is herein incorporated by reference. This patent application is related to U.S. patent application Ser. No. 15/418,611, filed Jan. 27, 2017.

TECHNICAL FIELD

Embodiments of the present disclosure relate, in general, to a method for creating a glass ceramic or a glaze from a eutectic system of fluorides, and to glass ceramics and glazes formed from the eutectic system of fluorides.

BACKGROUND

Various manufacturing processes expose chamber components and their coating materials to high temperatures, high energy plasma, a mixture of corrosive gases, high stress, and combinations thereof. Rare earth oxides are frequently used in chamber component manufacturing due to their resistance to erosion from plasma etch chemistries. However, these rare earth oxide components transform into fluorides during processing of wafers from exposure to fluorine based chemistries. The transformation of the rare earth oxide into a rare earth fluoride is usually combined with a volume expansion and added stress. For example, the transformation of one mole of $Y_2O_3$ (yttria) to two moles of $YF_3$ (yttrium fluoride) has a theoretical volume expansion of about 60%. The volume expansion and added stress caused by conversion of a rare earth oxide into a rare earth fluoride can the chamber components to be responsible for particle defects by shedding particles onto processed wafers.

In some instances $YF_3$ has been used as a coating for chamber components. However, $YF_3$ has a high melting temperature of 1400° C. and fluoride is unstable at high temperatures (e.g., temperatures above about 1000° C.). Additionally, glazes formed of $YF_3$ are susceptible to cracking and formation of bubbles. Accordingly, it can be difficult to effectively form glazes of $YF_3$ coatings.

SUMMARY

In an example implementation of a first method for forming a glaze or a glass ceramic, a first fluoride having a first melting temperature is mixed with a second fluoride having a second melting temperature that is lower than the first melting temperature to form a mixture comprising the first fluoride and the second fluoride. The first fluoride and the second fluoride are melted by heating the mixture of the first fluoride and the second fluoride to a first temperature above at least the second melting temperature. The mixture is cooled to form a material comprising a eutectic system having a super-lattice of the first fluoride and the second fluoride, wherein the eutectic system has a third melting temperature that is below the first melting temperature and the second melting temperature. The material is ground into a powder. An article or a coating is then formed using the powder. The article or coating is heated to a second temperature that is below the first melting temperature, below the second melting temperature and above the third melting temperature to cause at least a portion of the article or the coating to transform into at least one of a glaze or a glass ceramic comprising the eutectic system.

In an example implementation of a second method for forming a glaze, an article or coating comprising an initial mixture including a first oxide and a second oxide is formed. The article or coating is heated to a treatment temperature of at least 910° C. The article or coating is exposed to anhydrous hydrogen fluoride gas at the treatment temperature of at least 910° C. Oxygen molecules in the first oxide and the second oxide are replaced with fluorine molecules at a surface of the article or the coating. The initial mixture comprising the first oxide and the second oxide is transformed into a final mixture comprising a first fluoride and a second fluoride at the surface of the article or the coating. A eutectic system is formed from the final mixture at the surface of the article or the coating, the eutectic system having a super-lattice of the first fluoride and the second fluoride. A glaze is then formed from the eutectic system at the surface of the article or the coating.

In another example implementation an article comprises a body having a coating on the body. The coating comprising a eutectic system having a super-lattice of a first fluoride and a second fluoride. The coating further comprises a glaze on a surface of the coating, the glaze comprising the eutectic system having the super-lattice of the first fluoride and the second fluoride. The coating may have been formed in accordance with the first method or the second method.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION OF EMBODIMENTS

Figure 1:
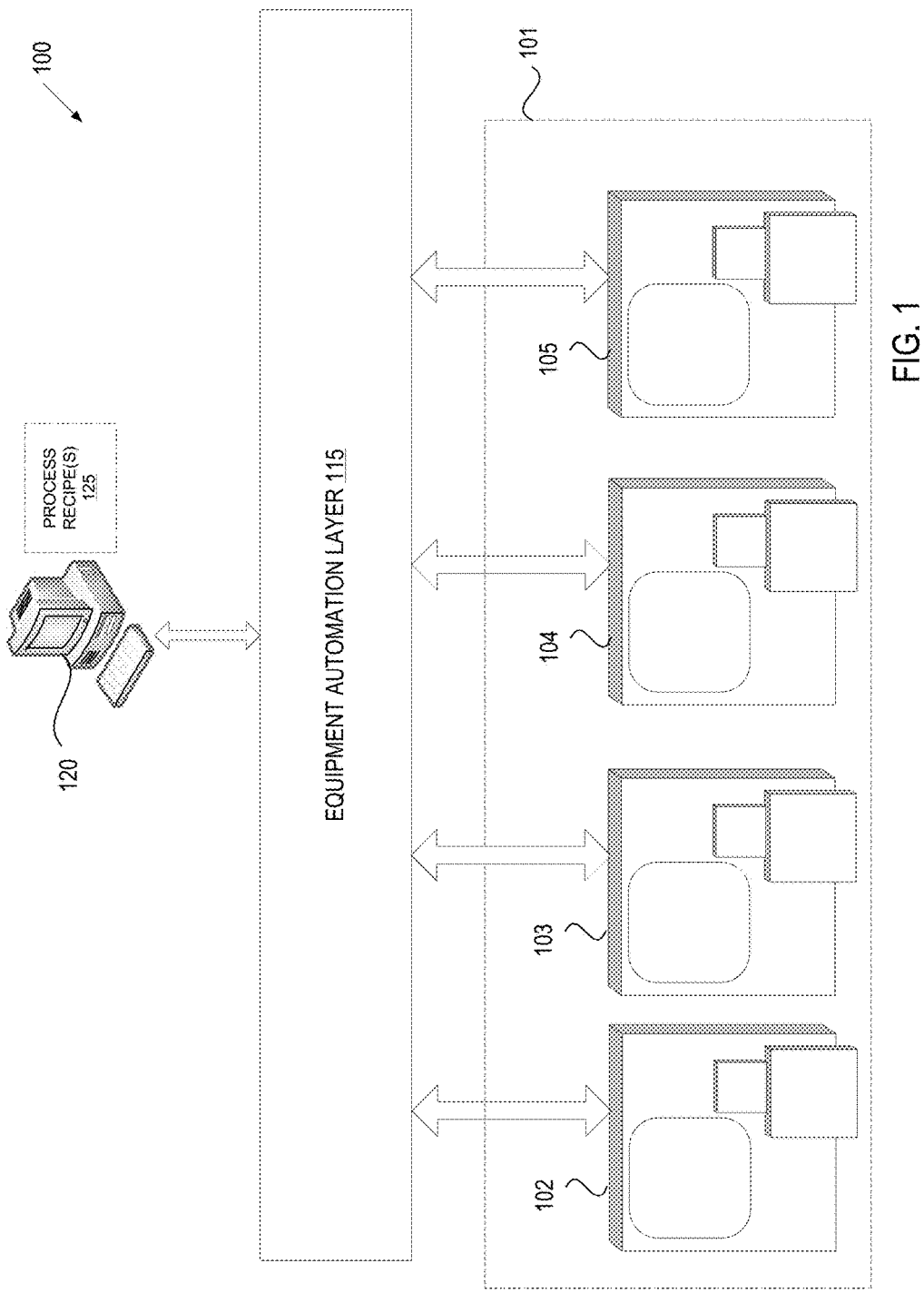
FIG. 1 illustrates an exemplary architecture of a manufacturing system, in accordance with one embodiment of the present invention.

Embodiments of the invention are directed to processes for forming a fluoride glaze on a surface of a coating or an article such as a chamber component for a processing chamber. In embodiments multiple fluorides are mixed to form a eutectic system having a melting temperature that is significantly lower than the melting temperatures of the individual fluorides (e.g., up to 700° C. lower in some instances), and then the mixture is melted and reflowed at a surface of the article or the coating to form the glaze. In other embodiments, an article or coating includes a mixture of multiple oxides. A high temperature surface treatment is then performed in a fluorine rich environment to transform the multiple oxides into multiple fluorides. The multiple fluorides then form the eutectic system, melt and form a glaze at a surface of the article or the coating. Embodiments of the invention are also directed to processes for forming an article having a glass ceramic of multiple fluorides. The multiple fluorides may be mixed and heated. The heated mixture may melt and form a eutectic system. The molten mixture may then be poured into a mold and cast to form the glass ceramic. Embodiments of the invention are also directed to articles and coatings having fluoride glazes and articles having fluoride glass ceramics.

Rare earth fluorides and metal fluorides generally have a high resistance to fluorine based chemistries, and can be characterized as a "fluorine based plasma resistant material." Additionally, oxy-fluorides generally have a high resistance to fluorine based chemistries. Rare earth fluorides, metal fluorides and oxy-fluorides are all generally more stable than oxides when exposed to fluorine chemistries. However, fluorides that are useful in industry have high melting temperatures and high vapor pressures near their melting temperatures. As a result, it can be very difficult to form glazes from fluorides. Glazes can provide improved performance for erosion resistance from plasma etch chemistries due to their low porosity and low surface roughness in comparison to standard ceramic coatings such as those deposited using thermal spraying, plasma spraying, dip coating, and so on.

The term "heat treating" is used herein to mean applying an elevated temperature to a ceramic article, such as by a furnace. "Plasma resistant material" refers to a material that is resistant to erosion and corrosion due to exposure to plasma processing conditions. The plasma processing conditions include a plasma generated from halogen-containing gases, such as $C_2F_6$, $SF_6$, $SiCl_4$, HBR, $NF_3$, $CF_4$, $CHF_3$, $CH_2F_3$, F, $NF_3$, $Cl_2$, $CCl_4$, $BCl_3$ and $SiF_4$, among others, and other gases such as $O_2$, or $N_2O$. The resistance of the material to plasma is measured through "etch rate" (ER), which may have units of Angstrom/min (Å/min), throughout the duration of the coated components' operation and exposure to plasma. Plasma resistance may also be measured through an erosion rate having the units of nanometer/radio frequency hour (nm/RFHr), where one RFHr represents one hour of processing in plasma processing conditions. Measurements may be taken after different processing times. For example, measurements may be taken before processing, after 50 processing hours, after 150 processing hours, after 200 processing hours, and so on. An erosion rate lower than about 100 nm/RFHr is typical for a plasma resistant coating material. A single plasma resistant material may have multiple different plasma resistance or erosion rate values. For example, a plasma resistant material may have a first plasma resistance or erosion rate associated with a first type of plasma and a second plasma resistance or erosion rate associated with a second type of plasma.

When the terms "about" and "approximately" are used herein, these are intended to mean that the nominal value presented is precise within ±10%. Some embodiments are described herein with reference to chamber components and other articles installed in plasma etchers for semiconductor manufacturing. However, it should be understood that such plasma etchers may also be used to manufacture micro-electro-mechanical systems (MEMS)) devices. Additionally, the articles described herein may be other structures that are exposed to plasma. Articles discussed herein may be chamber components for processing chambers such as semiconductor processing chambers. For example, the articles may be chamber components for a plasma etcher, a plasma cleaner, a plasma propulsion system, or other processing chambers. The processing chambers may be used for processes in which a corrosive plasma environment having plasma processing conditions is provided. For example, the processing chamber may be a chamber for a plasma etcher or plasma etch reactor, a plasma cleaner, and so forth. Examples of chamber components include a substrate support assembly, an electrostatic chuck (ESC), a ring (e.g., a process kit ring or single ring), a chamber wall, a base, a gas distribution plate, a showerhead, a nozzle, a lid, a liner, a liner kit, a shield, a plasma screen, a flow equalizer, a cooling base, a chamber viewport, a chamber lid, and so on.

Moreover, embodiments are described herein with reference to ceramic articles that cause reduced particle contamination when used in a process chamber for plasma rich processes. However, it should be understood that the ceramic articles discussed herein may also provide reduced particle contamination when used in process chambers for other processes such as non-plasma etchers, non-plasma cleaners, chemical vapor deposition (CVD) chambers physical vapor deposition (PVD) chambers, plasma enhanced chemical vapor deposition (PECVD) chambers, plasma enhanced physical vapor deposition (PEPVD) chambers, plasma enhanced atomic layer deposition (PEALD) chambers, and so forth.

FIG. 1 illustrates an exemplary architecture of a manufacturing system 100, in accordance with embodiments of the present invention. The manufacturing system 100 may be a ceramics manufacturing system. In one embodiment, the manufacturing system 100 includes processing equipment 101 connected to an equipment automation layer 115. The processing equipment 101 may include a ceramic coater 104, a grinder 103, a mixer 105 and/or a furnace 102. The manufacturing system 100 may further include one or more computing device 120 connected to the equipment automation layer 115. In alternative embodiments, the manufacturing system 100 may include more or fewer components. For example, the manufacturing system 100 may include manually operated (e.g., off-line) processing equipment 101 without the equipment automation layer 115 or the computing device 120.

Grinders 103 are machines having an abrasive disk, wheel or other grinding mechanism that grinds materials such as ceramics. The grinders 103 may include a grinding system such as a ball mill that reduces ceramics to powder. The grinders 103 may grind the ceramics in multiple steps, where each step grinds the ceramics to a finer powder having smaller diameter particles.

Mixers 105 are machines used to mix together ceramic powders. One example of a mixer is a ball mill, which may also function as a grinder in embodiments.

Ceramic coater 104 is a machine configured to apply a ceramic coating to the surface of an article or object (e.g., to the surface of a chamber component). In one embodiment, ceramic coater 104 is a plasma sprayer that plasma sprays a ceramic coating onto the ceramic substrate. In alternative embodiments, the ceramic coater 104 may apply other thermal spraying techniques such as detonation spraying, wire arc spraying, high velocity oxygen fuel (HVOF) spraying, flame spraying, warm spraying and cold spraying may be used. Additionally, ceramic coater 104 may perform other coating processes such as aerosol deposition, physical vapor deposition (PVD), doctor blade coating, dip coating, and chemical vapor deposition (CVD) to form the ceramic coating.

Furnace 102 is a machine designed to heat articles such as ceramic articles. Furnace 102 includes a thermally insulated chamber, or oven, capable of applying a controlled temperature on articles (e.g., ceramic articles) inserted therein. In one embodiment, the chamber is hermetically sealed. Furnace 102 may include a pump to pump air out of the chamber, and thus to create a vacuum within the chamber. Furnace 102 may additionally or alternatively include a gas inlet to pump gasses (e.g., inert gasses such as Ar or $N_2$ and/or reactive gases such as hydrogen fluoride (HF)) into the chamber.

In one embodiment, the furnace 102 is a furnace (e.g., a retort furnace) designed to perform fluoride ion cleaning (FIC). FIC is a heat treatment that is performed in the presence of anhydrous hydrogen fluoride (HF) gas to remove embedded oxides from treated articles. A flow rate for the HF gas may depend on a size of the furnace. In embodiment, a flow rate for the HF gas of 1 liter per minute may be used for a 10 cubic foot furnace in one embodiment. Other possible flow rates for the HF gas and for a 10 cubit coot furnace include 0.8-1.2 liters per minute. The flow rate may scale with changes in chamber size. FIC may be performed in a temperature range of 100 torr (122 mbar) to atmospheric pressure and a temperature range of about 955 to 1040° C. FIC may also be performed at other temperatures as low as about 350° C. In one embodiment, FIC is performed at a temperature of at least 910°. In FIC, HF gas contacts a surface of an article, and is forced into voids and cracks in the surface. The HF gas reacts with oxides to form fluorides. HF concentration, processing time, pressure and temperature may be adjusted to achieve desired results.

Furnace 102 may be a manual furnace having a temperature controller that is manually set by a technician during processing of ceramic articles. Furnace 102 may also be an off-line machine that can be programmed with a process recipe 125. The process recipe 125 may control ramp up rates, ramp down rates, process times, temperatures, pressure, gas flows, and so on. Alternatively, furnace 102 may be an on-line automated furnace that can receive process recipes 125 from computing devices 120 such as personal computers, server machines, etc. via an equipment automation layer 115. The equipment automation layer 115 may interconnect the furnace 102 with computing devices 120, with other manufacturing machines, with metrology tools and/or other devices.

The equipment automation layer 115 may interconnect some or all of the manufacturing machines 101 with computing devices 120, with other manufacturing machines, with metrology tools and/or other devices. The equipment automation layer 115 may include a network (e.g., a location area network (LAN)), routers, gateways, servers, data stores, and so on. Manufacturing machines 101 may connect to the equipment automation layer 115 via a SEMI Equipment Communications Standard/Generic Equipment Model (SECS/GEM) interface, via an Ethernet interface, and/or via other interfaces. In one embodiment, the equipment automation layer 115 enables process data (e.g., data collected by manufacturing machines 101 during a process run) to be stored in a data store (not shown). In an alternative embodiment, the computing device 120 connects directly to one or more of the manufacturing machines 101.

In one embodiment, some or all manufacturing machines 101 include a programmable controller that can load, store and execute process recipes. The programmable controller may control temperature settings, gas and/or vacuum settings, time settings, etc. of manufacturing machines 101. The programmable controller may include a main memory (e.g., read-only memory (ROM), flash memory, dynamic random access memory (DRAM), static random access memory (SRAM), etc.), and/or a secondary memory (e.g., a data storage device such as a disk drive). The main memory and/or secondary memory may store instructions for performing heat treatment processes described herein.

The programmable controller may also include a processing device coupled to the main memory and/or secondary memory (e.g., via a bus) to execute the instructions. The processing device may be a general-purpose processing device such as a microprocessor, central processing unit, or the like. The processing device may also be a special-purpose processing device such as an application specific integrated circuit (ASIC), a field programmable gate array (FPGA), a digital signal processor (DSP), network processor, or the like. In one embodiment, programmable controller is a programmable logic controller (PLC).

In one embodiment, the manufacturing machines 101 are programmed to execute recipes that will cause the manufacturing machines to heat treat an article, coat a ceramic article, and so on. In one embodiment, the manufacturing machines 101 are programmed to execute process recipes 125 that perform operations of a multi-step process for manufacturing an article or coating, as described with reference to FIGS. 2-5. The computing device 120 may store one or more process recipes 125 that can be downloaded to the manufacturing machines 101 to cause the manufacturing machines 101 to manufacture articles in accordance with embodiments of the present invention.

Figure 2:
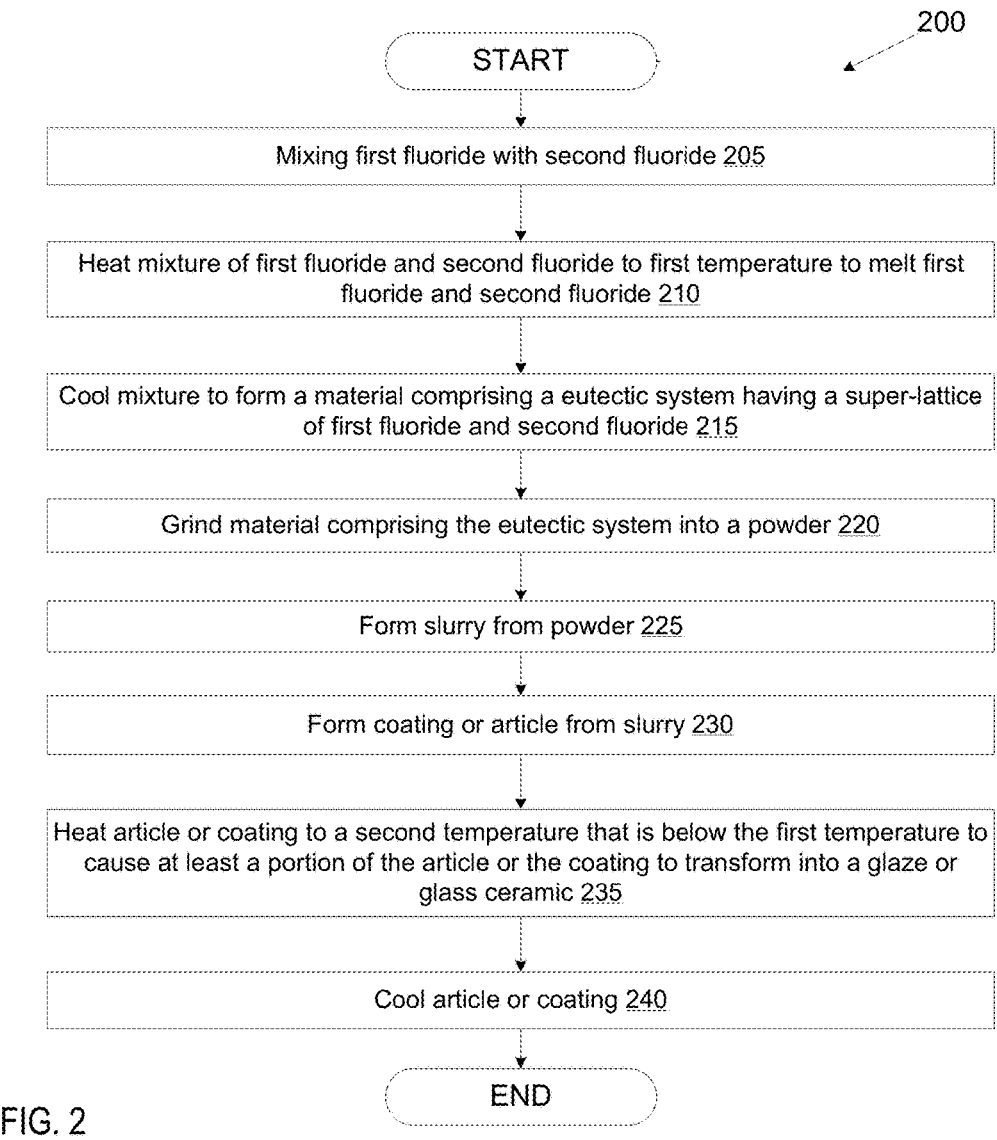
FIG. 2 illustrates a process for manufacturing a coating or article from a mixture of multiple fluorides according to an embodiment.

FIG. 2 is a flow chart showing a process 200 for manufacturing a coating or article from a mixture of multiple fluorides according to an embodiment. The operations of process 200 may be performed by various manufacturing machines, such as those set forth in FIG. 1.

At block 205, a first fluoride is mixed with a second fluoride. In one embodiment, the two fluorides are mixed by ball milling. The first fluoride may be a metal fluoride or a rare earth fluoride, and may be one of $CaF_2$, $MgF_2$, $SrF_2$, $AlF_3$, $ErF_3$, $LaF_3$, $NdF_3$, $ScF_3$, $CeF_4$, $TiF_3$, $HfF_4$, $ZrF_4$, $SiF_4$, and $YF_3$. Additionally, the second fluoride may be a metal fluoride or a rare earth fluoride, and may be one of $CaF_2$, $MgF_2$, $SrF_2$, $AlF_3$, $ErF_3$, $LaF_3$, $NdF_3$, $ScF_3$, $CeF_4$, $TiF_3$, $HfF_4$, $ZrF_4$, $SiF_4$, and $YF_3$. The first fluoride and the second fluoride may have different melting temperatures. A table listing various fluorides, their melting temperatures and their densities is provided below.

TABLE 1

Fluoride melting temperatures and densities

| Fluoride | Melting Point (° C.) | Density (g/cm³) |
| --- | --- | --- |
| $CaF_2$ | 1360 | 3.18 |
| $MgF_2$ | 1263 | 3.15 |
| $SrF_2$ | 1450 | 4.24 |
| $AlF_3$ | 1257 | 3.19 |
| $ErF_3$ | 1350 | 7.8 |
| $LaF_3$ | 1490 | 4.01 |
| $NdF_3$ | 1410 | 6.65 |
| $ScF_3$ | 1552 | 2.53 |
| $CeF_4$ | 1418 | 4.77 |
| $TiF_3$ | 1200 | 3.4 |
| $HfF_4$ | 1000 | 7.1 |
| $ZrF_4$ | 910 | 4.43 |
| $YF_3$ | 1487 | 4.01 |

The molar percentage (mole %) of the first fluoride and the molar percentage (mole %) of the second fluoride that are mixed may be based on the ratio of the first fluoride to the second fluoride that can achieve a eutectic system of the two fluorides. The ratio of two components that can achieve a eutectic system is referred to as a eutectic percentage ratio. For most combinations the eutectic system can be achieved at about 50 mole % of the first fluoride and 50 mole % of the second fluoride (e.g., the eutectic percentage ratio is about 45-55% of both fluorides). However, some combinations of fluorides use a combination of about 20-40 mole % of the first fluoride and 60-80 mole % of the second fluoride to form a eutectic system. For example, a combination of about 47-52 mole % $ErF_3$ and 48-53 mole % $HfF_4$ may achieve a eutectic system. A combination of about 45-55 mole % $NdF_3$ and 45-55 mole % $HfF_4$ may achieve a eutectic system. A combination of about 48-52 mole % $YF_3$ and 48-52 mole % $HfF_4$ may achieve a eutectic system. A combination of about 45-55 mole % $LaF_4$ and 45-55 mole % $HfF_4$ may achieve a eutectic system. A combination of about 23-37 mole % $ZrF_4$ and 63-77 mole % $LaF_4$ may achieve a eutectic system.

As shown in table 1, $ZrF_4$ has a melting temperature of 910° C., which is lower than the melting temperatures of any of the other rare earth fluorides and metal fluorides listed. Zirconium based fluorides and zirconium based oxides have beneficial property with regards to plasma resistance. Additionally, due to the relatively low melting temperature of $ZrF_4$, eutectic systems formed from $ZrF_4$ and another fluoride have melting temperatures that are favorably low (e.g., as low as around 700° C. in some embodiments). Accordingly, in one embodiment the mixture includes $ZrF_4$ and another fluoride. In one embodiment, a third fluoride and/or a fourth fluoride are also mixed together with the first fluoride and the second fluoride.

The coefficient of thermal expansion (CTE) of fluorides are generally higher than the CTE of oxide counterparts. For example, $YF_3$ has a CTE of 14 ppm/K and $Y_2O_3$ has a CTE of 6 ppm/K. A fluoride rich glaze over an oxide may result in stress and/or cracking in the glaze due to the differences in CTE. $ScF_3$ is a rare earth fluoride with a melting temperature of 1552° C. and a negative CTE of −7 ppm/K at room temperature. $ScF_3$ may be used as the first fluoride or the second fluoride in embodiments to reduce a CTE of a coating formed from the fluoride mixture and minimize a mismatch between a glaze formed from the fluoride mixture and an underlying oxide. In one embodiment, a mixture of at least three fluorides that includes $ZrF_4$, $ScF_3$ and at least one other fluoride (e.g., $TiF_4$ or $YF_3$) is used. The molar percentages of these the at least three fluorides may be selected to correspond to the eutectic percentage ratio for the selected fluorides.

At block 210, the mixture of the first fluoride and the second fluoride (an in some instances one or more additional fluorides) is heated to a first temperature to melt the first fluoride and/or the second fluoride. In one embodiment, the mixture is heated to a temperature that is above the melting temperature of the first fluoride but below the melting temperature of the second fluoride, where the first fluoride has a lower melting temperature than the second fluoride. For example, if the mixture includes $ZrF_4$ and $YF_3$, the mixture may be heated to a temperature that is between 910° C. and 1000° C. The first fluoride melts, and the molten first fluoride causes a portion of the second fluoride (and/or other fluorides) to dissolve and also become molten.

The molten second fluoride (and/or other fluorides) mixes with the molten first fluoride and slightly lowers the melting temperature of the remaining second fluoride (and/or other fluorides). An additional amount of the second fluoride (and/or other fluorides) dissolves and becomes molten, which then further mixes with the molten first fluoride (and/or other fluorides). The addition of more molten second fluoride (and/or other molten fluorides) to the molten mixture further reduces the melting temperature, which enables still more of the second fluoride (and/or other fluorides) to dissolve and become molten. This process may continue until all of the second fluoride (and/or other fluorides) becomes molten even though the mixture has not been heated to the melting temperature of the second fluoride (and/or other fluorides). In an alternative embodiment, the mixture may be heated to a temperature that is above the melting point of the first fluoride and the melting point of the second fluoride (and/or other fluorides).

At block 215, the molten mixture of the first fluoride and the second fluoride (and possibly other fluorides) is cooled to form a material comprising a eutectic system. The eutectic system is a joint super-lattice of the first fluoride and the second fluoride. Each fluoride in the eutectic system has its own distinct bulk lattice arrangement. The eutectic system is formed at a particular molar ratio (or narrow range of molar ratios) between the first fluoride and the second fluoride. At the particular molar ratio range, the eutectic system gains a new melting temperature that is lower than the melting temperature of the first fluoride and the melting temperature of the second fluoride (and the melting temperatures of any additional constituent fluorides). The new lower melting temperature is called the eutectic temperature. At the eutectic temperature the super-lattice releases at once all its components into a liquid mixture during heating. Conversely, as the mixture of molten fluorides that has the eutectic percentage ratio is cooled to the eutectic temperature, the two (or more) fluorides solidify together into a homogeneous solid mix of the two (or more) fluorides that is arranged as a joint super-lattice of the two (or more) fluorides. The eutectic temperature is the lowest possible melting temperature over all of the mixing ratios for the involved component species. As an example, a mixture of 23-37 mole % of $ZrF_4$ and 63-77 mole % $LaF_4$ has a eutectic temperature of approximately 770° C.

As indicated above, in some embodiments, a third and/or fourth fluoride may also be mixed with the first fluoride and the second fluoride. A ratio of the first fluoride, the second fluoride, the third fluoride and/or fourth fluoride may be selected to reach the eutectic percentage ratio of the mixture. In such an embodiment, all three or four fluorides would melt at block 210, and the three or four fluorides would similarly form a ceramic that has a composition that is a eutectic system on cooling. For example, a mixture of approximately 50 mole % $YF_3$, approximately 15 mole % $ZrF_4$ and approximately 35 mole % $ScF_3$ may have a melting temperature of around 800° C. (which is at or near the eutectic temperature for the combination of $ZrF_4$, $ScF_3$ and $YF_3$). The mixture may also have a CTE of about 7 ppm/K, which is similar to the CTE of $Al_2O_3$ and $Y_2O_3$.

At block 220, the ceramic having the eutectic system is ground into powder. The powder may have an average diameter of about 0.25 microns to about 4 microns in some embodiments. The size off the powder may be dependent on a surface that will be coated using the powder. If the powder will be used to form a slurry that will coat features such as holes, then a smaller particle size may be used.

At block 225, the powder is mixed with a solvent to form a slurry. The slurry may be formed by suspending the powder in a suspending medium (e.g., a solvent), which may include a binder. The solvent used to form the slurry may be an organic solvent or a nonorganic solvent, and may or may not be a polar solvent. Examples of solvents that may be used include isopropyl alcohol, water, ethanol, methanol, and so on. Examples of binders that may be added to the solvent include polyvinyl alcohol (PVA) and/or polymeric cellulose ether.

At block 230, the slurry is used to form a coating or an article. In one embodiment, a coating is formed from the slurry by performing a deposition technique such as thermal spray coating, plasma spray coating, doctor blade coating, dip coating, spin coating, screen printing, or other coating techniques that apply slurries. A thickness of the coating may be dependent on the deposition method used to form the coating. Additionally, the thickness of the coating may be adjusted by adjusting slurry viscosity, pH, and/or the binder. In embodiments the coating has a thickness of between 1 micron and 500 microns. In some embodiments, the coating has a thickness of about 10 microns to about 200 microns. In some embodiments, the coating has a thickness of about 20 microns to about 60 microns. The coating may be deposited on an article such as a chamber component for a processing chamber. Using techniques such as dip coating, the coating can be formed over three dimensional (3D) structures such as the walls of a gas line or the holes in a showerhead. In one embodiment, the coating is formed in a vacuum or an inert atmosphere (e.g., in an Ar or $N_2$ atmosphere).

In one embodiment, an article is formed from the slurry. The slurry may be poured into a mold and cast into a shape governed by the shape of the mold. The solvent may evaporate to leave behind an article that is a ceramic solid having the shape set by the mold. The article may then be removed from the mold. In one embodiment, the article is formed in a vacuum or an inert atmosphere (e.g., in an Ar or $N_2$ atmosphere).

At block 235, the article and/or coating are heated to a second temperature to cause the coating or article to become molten and reflow. At block 240, the article is cooled, and during the cooling the article transforms into a glaze or a glass ceramic (also referred to as a glass ceramic). Since the article or coating is formed from a eutectic system of at least two fluorides, the melting temperature for the article or the coating is the eutectic temperature, which can be significantly lower than the melting temperature of the individual fluorides. Accordingly, the second temperature is lower than the first temperature that was used to initially create the eutectic system.

In the instance that an article was formed from the slurry, a surface of the article may form a glaze or glass ceramic (e.g., a glass ceramic). The glaze that is formed on the surface of the article may have a thickness of up to about 100 microns in embodiments. In the instance that a coating was formed from the slurry and deposited on an article, either a portion of the coating or all of the coating may melt, reflow and transform into a glaze or glass ceramic. The glaze or glass ceramic may have a porosity of below 1%. In some instances, the porosity is 0% or close to 0%. The glaze or glass ceramic may also have a low average surface roughness (Ra), which may have a value as low as 5 micro-inches in embodiments.

A glaze is a specialized form of glass and can be described as an amorphous solid. A glass ceramic or glass network is a specialized form of ceramics, which is formed first as a glass and then made to crystallize partly through a designed heat treatment which involves controlled cooling. Unlike traditional sintered ceramics, glass ceramics do not have pores between crystal grains. The spacing between grains is filled with the glass. Glass ceramics share many properties with both glass and traditional crystalline ceramics. After adjusting the composition of glass ceramics by processing, the final material may exhibit a number of properties that the traditional ceramics do not have. When the melted coating or surface of the article is cooled rapidly, typically a glaze is produced. When the coating or surface of the article is cooled slowly, a glass-ceramic may be produced.

Figure 3:
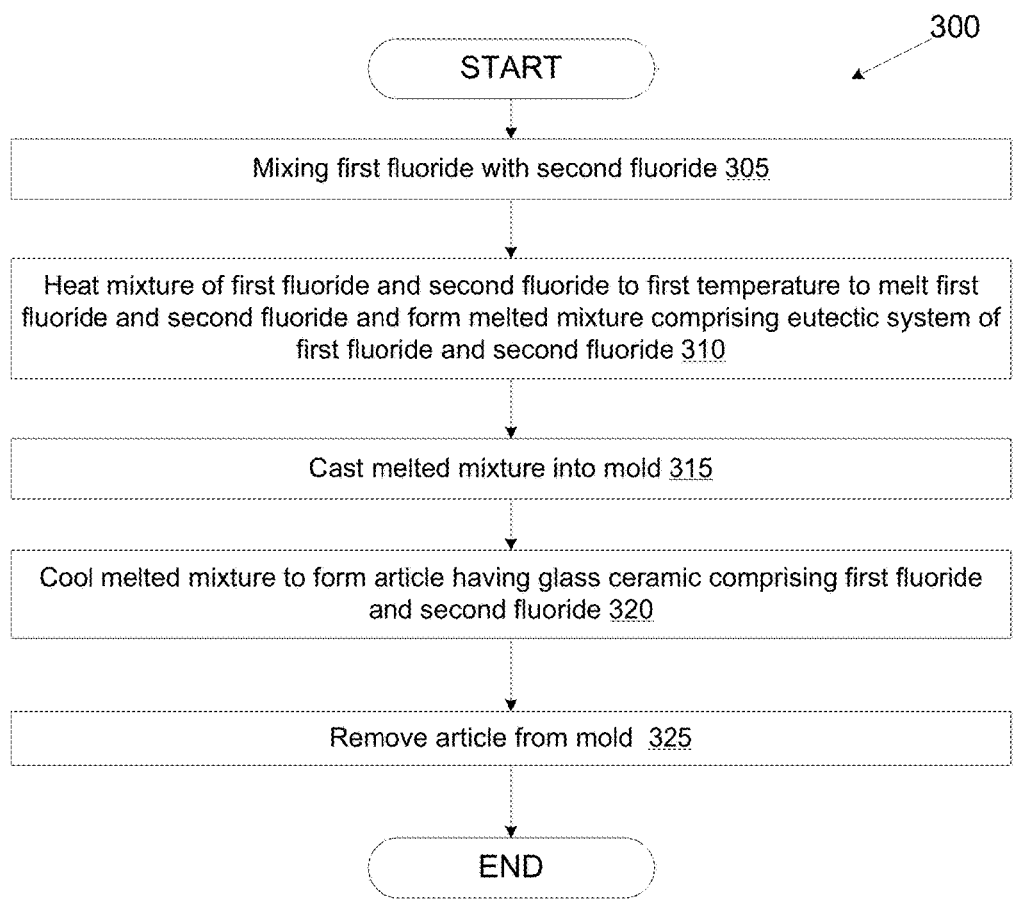
FIG. 3 illustrates a process for casting an article from a molten mixture of multiple fluorides according to an embodiment.

FIG. 3 illustrates a process 300 for casting an article from a molten mixture of multiple fluorides according to an embodiment. The operations of process 300 may be performed by various manufacturing machines, such as those set forth in FIG. 1.

At block 305, a first fluoride is mixed with a second fluoride. In one embodiment, the two fluorides are mixed by ball milling. The first fluoride may be a metal fluoride or a rare earth fluoride, and may be one of $CaF_2$, $MgF_2$, $SrF_2$, $AlF_3$, $ErF_3$, $LaF_3$, $NdF_3$, $ScF_3$, $CeF_4$, $TiF_3$, $HfF_4$, $ZrF_4$, and $YF_3$. Additionally, the second fluoride may be a metal fluoride or a rare earth fluoride, and may be one of $CaF_2$, $MgF_2$, $SrF_2$, $AlF_3$, $ErF_3$, $LaF_3$, $NdF_3$, $ScF_3$, $CeF_4$, $TiF_3$, $HfF_4$, $ZrF_4$, and $YF_3$. In one embodiment the mixture includes $ZrF_4$ and another fluoride. In one embodiment, a third fluoride and/or a fourth fluoride are also mixed together with the first fluoride and the second fluoride.

The molar percentage (mole %) of the first fluoride and the molar percentage (mole %) of second fluoride that are mixed may be based on the ratio of the first fluoride to the second fluoride that can achieve a eutectic system of the two fluorides. Accordingly, the ratio of the first fluoride to the second fluoride that is used corresponds to the eutectic percentage ratio for those fluorides. If more than two fluorides are used, then the ratios of the three or four fluorides are in accordance with the eutectic percentage ratio for that combination of three or four fluorides.

At block 310, the mixture of the first fluoride and the second fluoride (and optionally the third fluoride and/or fourth fluoride) is heated to a first temperature to melt the first fluoride and/or the second fluoride (and optionally the third and/or fourth fluoride). In one embodiment, the mixture is heated to a temperature that is above the melting temperature of the first fluoride but below the melting temperature of the second fluoride (and/or additional fluorides), where the first fluoride has a lower melting temperature than the second fluoride (and/or additional fluorides). For example, if the mixture includes $ZrF_4$ and $YF_3$, the mixture may be heated to a temperature that is between 910° C. and 1000° C. The first fluoride melts, and the molten first fluoride causes a portion of the second fluoride to dissolve and also become molten.

The molten second fluoride (and/or additional fluorides) mixes with the molten first fluoride and slightly lowers the melting temperature of the remaining second fluoride (and/or additional fluorides). An additional amount of the second fluoride dissolves and becomes molten, which then further mixes with the molten first fluoride. The addition of more molten second fluoride (and/or additional fluorides) to the molten mixture further reduces the melting temperature, which enables still more of the second fluoride (and/or additional fluorides) to dissolve and become molten. This process may continue until all of the second fluoride (and/or additional fluorides) becomes molten even though the mixture has not been heated to the melting temperature of the second fluoride (and/or additional fluorides). In an alternative embodiment, the mixture may be heated to a temperature that is above the melting point of the first fluoride and the melting point of the second fluoride and/or additional fluorides.

At block 315, the molten mixture of the first fluoride and the second fluoride is poured into a mold and cast in the mold. In one embodiment, the casting is performed in a vacuum or an inert atmosphere (e.g., in an Ar or $N_2$ atmosphere). At block 320, the melted or molten mixture is cooled to form an article composed of a material comprising a eutectic system. As the mixture of molten fluorides that has the eutectic percentage ratio is cooled to the eutectic temperature, the two (or more) fluorides solidify together into a homogeneous solid mix of the two (or more) fluorides that is arranged as a joint super-lattice of the two (or more) fluorides. The cooled article may be a glass ceramic having a network of the two fluorides. At block 325, the article is removed from the mold.

In an alternative embodiment, the molten mixture may be cooled to form a ceramic without casting the molten mixture a mold. The ceramic may then be ground into powder. At a later time, the powder may be heated to the eutectic temperature to melt the powder, and the melted powder may be cast into the mold to form a shape. Alternatively, the ceramic may not be ground into a powder prior to melting it to perform the casting. In either case, the ceramic is a eutectic system of the two or more fluorides, and will melt at the eutectic temperature.

Figure 4:
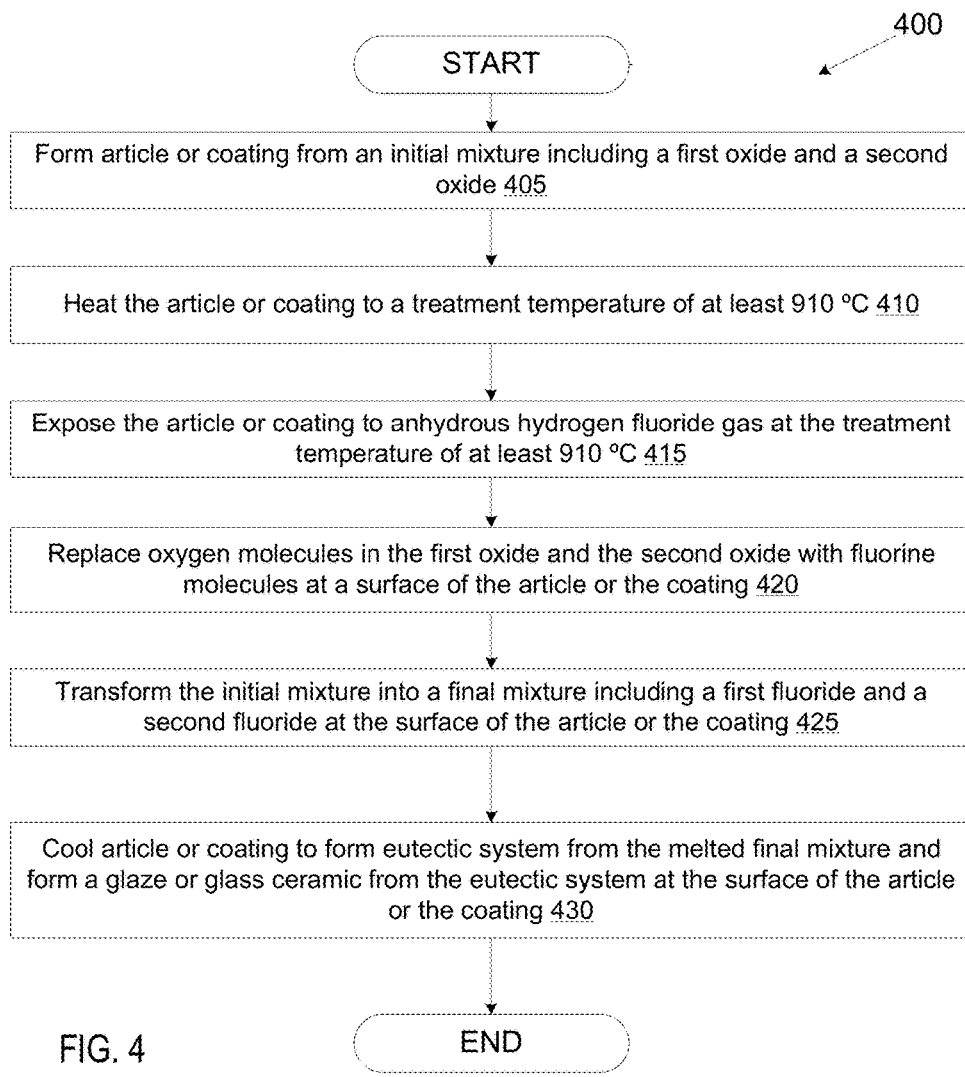
FIG. 4 illustrates a process for performing fluorine ion heat treatment on an article or coating that includes a mixture of oxides according to an embodiment.

FIG. 4 illustrates a process 400 for performing fluorine ion heat treatment on an article or coating that includes a mixture of oxides according to an embodiment. The operations of process 400 may be performed by various manufacturing machines, such as those set forth in FIG. 1. In one embodiment, FIC is performed on the article or coating.

At block 405, an article may be formed from an initial mixture that includes a first oxide and a second oxide. The mixture may also include more than two oxides. The article may be a bulk sintered ceramic article, and may be a chamber component. Alternatively, at block 405 a coating of an initial mixture that includes a first oxide and a second oxide (and possible one or more additional oxides) is formed on the surface of an article. The article may be a chamber component.

The first oxide and the second oxide may each be one of $Y_2O_3$, $Nd_2O_3$, $La_2O_3$, $Er_2O_3$, $Sc_2O_3$, $TiO_2$, $ZrO_2$, $HfO_2$, $Al_2O_3$ and $SiO_2$. The initial mixture of the two or more oxides may have various compositions. For example, the initial mixture may be a mixture of $Y_2O_3$ and $Al_2O_3$ in the form of $Y_3Al_5O_{12}$ (YAG) or $Y_4Al_2O_9$ (YAM). In another example, the initial mixture may be a mixture of $Y_2O_3$ and $ZrO_2$ in the form of $Y_2O_3$ stabilized $ZrO_2$ (YSZ). In another example, the initial mixture may $Er_3Al_5O_{12}$ (EAG), $Gd_3Al_5O_{12}$ (GAG), or a ceramic compound comprising $Y_4Al_2O_9$ and a solid-solution of $Y_2O_3$—$ZrO_2$. The ratio of the first oxide to the second oxide (and/or additional oxides) may be configured such that during later heat treatment in the presence of HF gas the oxides will convert to a mixture of two (or more) fluorides that has the eutectic percentage ratio.

At block 410, the article or coating is heated to a treatment temperature that is above a melting temperature of at least one of the fluorides that will be formed from the two (or more) oxides. For example, $ZrO_2$ may be converted into $ZrF_4$, which has a melting temperature of 910° C. If the article or coating includes $ZrO_2$, then the article or coating may be heated to a temperature that is above 910° C. In one embodiment, the article is heated to a temperature of about 910 to 1040° C. In one embodiment, the article is heated to a temperature of about 955 to 1040° C.

At block 415, the article or coating is exposed to HF gas (e.g., anhydrous hydrogen fluoride gas) at the treatment temperature of over 910° C. The heat treatment in the presence of the HF gas causes a chemical reaction at the surface of the article or coating that converts the oxides into fluorides. Some example reactions are shown below:

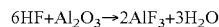

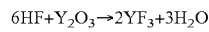

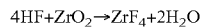

The water that results from the reaction evaporates at the treatment temperature, leaving behind the fluoride. Accordingly, at block 420 a chemical reaction is performed that replaces the oxygen molecules in the first oxide and the second oxide (and any additional oxides) with fluorine molecules at a surface of the article or coating. The reaction depth is a function of time and temperature. The reaction may penetrate into the surface of the article or coating to a depth of from about 0.5 microns to a depth of up to about 100 microns in some embodiments. At block 425, the initial mixture of the first oxide and the second oxide (and any additional oxides) is transformed into a final mixture of a first fluoride and a second fluoride (and any additional fluorides).

If the ratio of the first oxide and the second oxide (and/or any additional oxides) was chosen correctly, then the final mixture of the first fluoride and the second fluoride (and/or any additional fluorides) will have the eutectic percentage ratio. As set forth above, the treatment temperature is above the lowest melting temperature of the two (or more) fluorides. For example, if the final mixture includes $ZrF_4$ and $YF_3$, the mixture may be heated to a temperature that is between 910° C. and 1000° C. The first fluoride melts, and the molten first fluoride causes a portion of the second fluoride to dissolve and also become molten.

The molten second fluoride mixes with the molten first fluoride and slightly lowers the melting temperature of the remaining second fluoride. An additional amount of the second fluoride dissolves and becomes molten, which then further mixes with the molten first fluoride. The addition of more molten second fluoride to the molten mixture further reduces the melting temperature, which enables still more of the second fluoride to dissolve and become molten. This process may continue until all of the second fluoride becomes molten even though the mixture has not been heated to the melting temperature of the second fluoride. In an alternative embodiment, the mixture may be heated to a temperature that is above the melting point of the first fluoride and the melting point of the second fluoride.

A similar process may occur if there are more than two fluorides. The exposure to the HF gas at the elevated temperature additionally may cause any trace metals such as transition metals or aluminum to vaporize and be removed from the surface of the article or coating. Accordingly, the heat treatment in the presence of HF gas (e.g., FIC process) may be used both to remove impurities and form a fluorides glaze. In one embodiment, the article or coating is a ceramic compound of $Y_4Al_2O_9$ and a solid-solution of $Y_2O_3$—$ZrO_2$. The exposure to the HF gas at the elevated temperature of at least 910° C. may cause the Al to form $AlF_3$, which boils off of the coating or article. The exposure to the HF gas at the elevated temperature further causes formation of $YF_3$ and $ZrF_4$, which may form a eutectic system and a glaze.

At block 430, the article or coating that includes the molten mixture of the first fluoride and the second fluoride (and any additional fluoride) is cooled to form a material comprising a eutectic system. The article or coating is cooled in a manner that causes the material to form a glaze of the eutectic system. As the mixture of molten fluorides that has the eutectic percentage ratio is cooled to the eutectic temperature, the two (or more) fluorides solidify together into a homogeneous solid mix of the two (or more) fluorides that is arranged as a joint super-lattice of the two (or more) fluorides. The glaze may have a thickness of about 1 micron to about 100 microns. In one embodiment, the entire coating is converted to a glaze, and the glaze is the thickness of the coating. In one embodiment, the glaze has a thickness that is 50% to 100% of the thickness of a coating that the glaze is formed from. Accordingly, half to all of the coating may be transformed into a glaze in embodiments.

Figure 5:
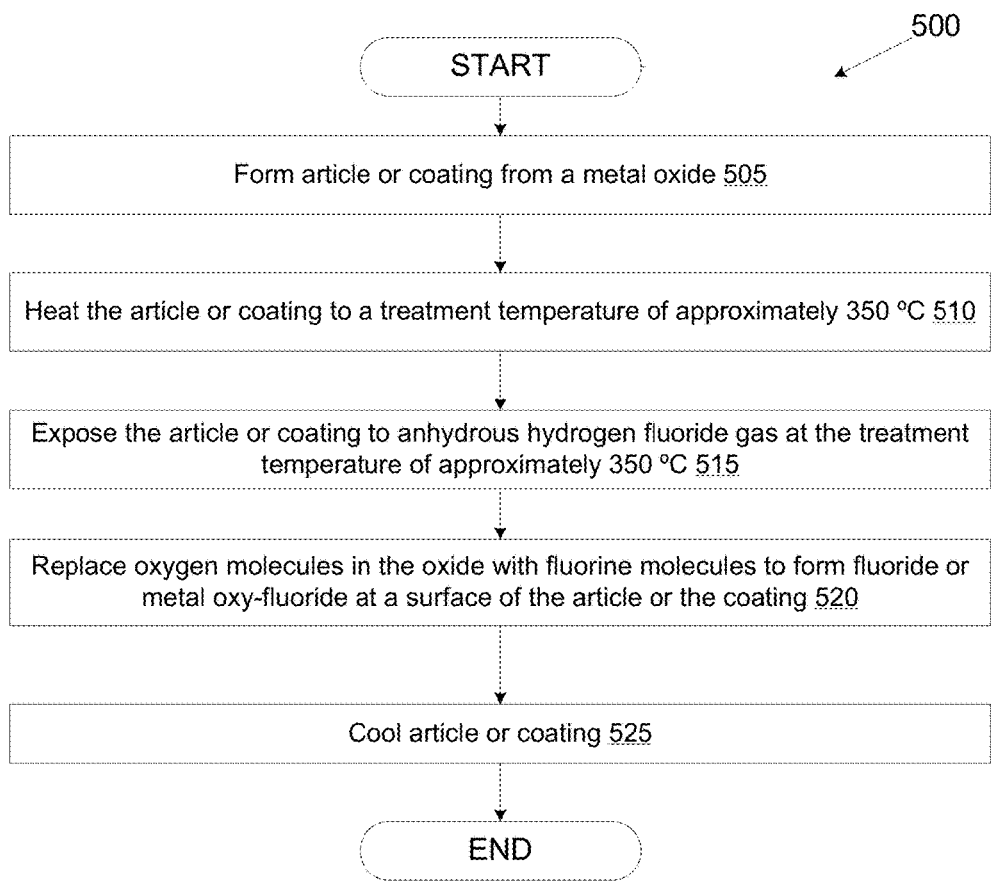
FIG. 5 illustrates a process for performing fluorine ion heat treatment on an article or coating that includes an oxide according to an embodiment.

FIG. 5 illustrates a process 500 for performing fluorine ion heat treatment on an article or coating that includes an oxide according to an embodiment. The operations of process 500 may be performed by various manufacturing machines, such as those set forth in FIG. 1.

At block 505, an article may be formed from an oxide. In one embodiment, the oxide is $Al_2O_3$. Alternatively, the oxide may be $Y_2O_3$, $ZrO_2$, $Nd_2O_3$, $La_2O_3$, $Er_2O_3$, $Sc_2O_3$, $TiO_2$, $HfO_2$, $SiO_2$ or another oxide. The article may be a bulk sintered ceramic article, and may be a chamber component. Alternatively, at block 505 a coating that is an oxide is formed on the surface of an article. The article may be a chamber component.

At block 510, the article is heated to a treatment temperature that is high enough to facilitate a chemical reaction that causes at least a portion of the oxide to become a fluoride, but below the melting temperature of materials to be treated. In one embodiment, the article is heated to a temperature of approximately 350° C. In another example, the article is heated to a temperature in a range from about 350° C. to about 1000° C. In another example, the article is heated to a temperature of about 1000° C. For example, a temperature of 350° C. may be used if the article or coating is $Al_2O_3$.

At block 515, the article or coating is exposed to HF gas (e.g., anhydrous hydrogen fluoride gas) at the treatment temperature of around 350° C. The heat treatment in the presence of the HF gas causes a chemical reaction at the surface of the article or coating that converts at least a portion of the oxide into a fluoride. Accordingly, at block 520 a chemical reaction is performed that replaces the oxygen molecules in the oxide with fluorine molecules at a surface of the article or coating. The reaction may penetrate into the surface of the article or coating to a depth of from about 0.5 microns to a depth of up to about 40 microns in embodiments. If all of the oxygen is replaced with fluorine at the surface, than the surface of the article or coating becomes a fluoride. For example, $Al_2O_3$ may become $AlF_4$. If less than all of the oxygen is converted into fluorine, then the surface becomes a metal oxy-fluoride or rare earth oxy-fluoride. Both the fluoride and the oxy-fluoride may be resistant to erosion from fluorine chemistries. At block 525, the article or coating is then cooled. Process 500 may be performed in embodiments as a replacement to anodization.

Figure 6A:
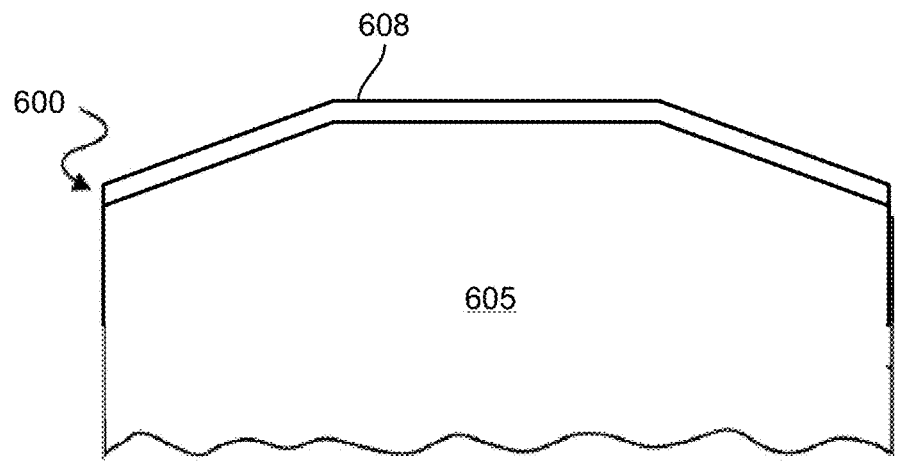
FIGS. 6A-6C depict sectional views of exemplary articles according to various embodiments.
Figure 6B:
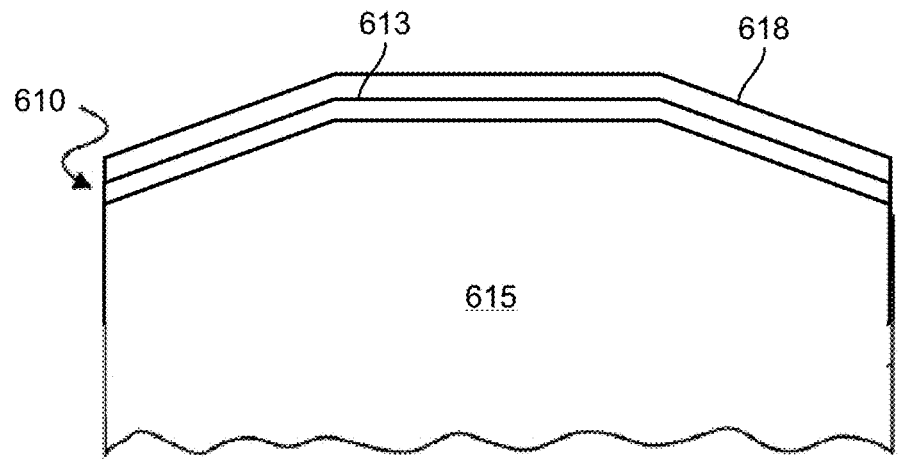
Figure 6C:
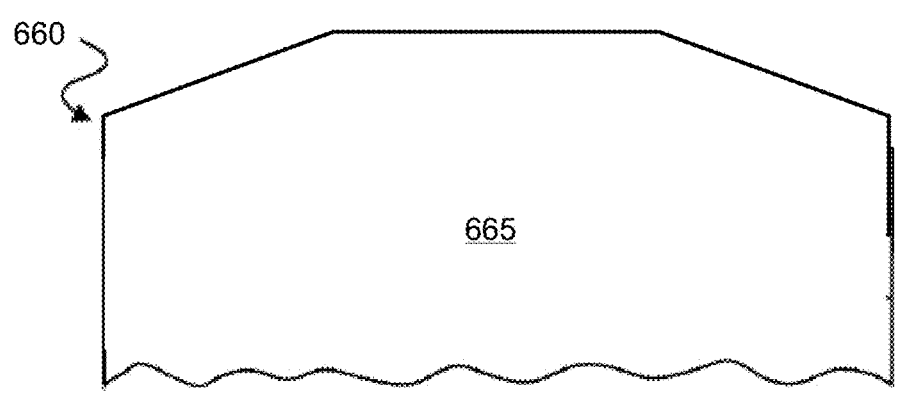

FIGS. 6A-6C depict sectional views of exemplary articles according to various embodiments. FIG. 6A illustrates an article 600 having a body 605 and a glaze 608 formed at a surface of the body 605. The body 605 may comprise various chamber components including but not limited to substrate support assembly, an electrostatic chuck (ESC), a ring (e.g., a process kit ring or single ring), a chamber wall, a base, a gas distribution plate, a showerhead, a nozzle, a lid, a liner, a liner kit, a shield, a plasma screen, a flow equalizer, a cooling base, a chamber viewport, a chamber lid, and so on. The body may be a bulk sintered ceramic that includes a combination of two or more fluorides that have the eutectic percentage ratio or approximately the eutectic percentage ratio. Alternatively, the body may be a bulk sintered ceramic that includes a single oxide or a combination of multiple oxides having a ratio that, when converted to fluorides, is at or near the eutectic percentage ratio for the mixture of fluorides. The glaze 608 may have been formed by any of the techniques described herein. The glaze may have a thickness of up to 100 microns in some embodiments.

FIG. 6B illustrates an article 610 having a body 615, a coating 613 on a surface of the body 615, and a glaze 618 on a surface of the coating 618. The article 610 may be a metal (such as aluminum, stainless steel), a ceramic, a metal-ceramic composite, a polymer, a polymer ceramic composite, or other suitable materials, and may further comprise materials such as AlN, Si, SiC, $Al_2O_3$, $SiO_2$, and so on. The coating 613 may be a plasma resistant coating that was coated on the body 605 through various techniques depending on the chosen application and coating properties. Some of the coating techniques may be plasma spraying techniques, thermal spraying techniques such as detonation spraying, wire arc spraying, high velocity fuel (HVOF) spraying, flame spraying, warm spraying and cold spraying, aerosol deposition, e-beam evaporation, electroplating, ion assisted deposition (IAD), physical vapor deposition (PVD), chemical vapor deposition (CVD), and plasma assisted deposition.

In one embodiment, the coating 613 is composed of a ceramic mixture including multiple different fluorides. The ratios of the multiple different fluorides in the coating may be at or near the eutectic percentage ratio for the mixture of fluorides. In such an embodiment, the coating may have been formed by any technique for coating a surface with a slurry, such as dip coating, spray coating, doctor blade coating, and so on. The coating may have a thickness of about 1 micron to about 100 microns. The glaze may also have a thickness of about 1 micron to about 100 microns. In one embodiment, the glaze has a thickness that is 50% to 100% of the thickness of the coating.

In one embodiment, the coating 613 is an oxide coating. The oxide coating may include a single metal or rare earth species, or may include multiple metal and/or rare earth species. If the coating 613 includes multiple metal and/or rare earth species, then the ratio of these species is selected such that when converted to a mixture of fluorides, those fluorides are at the eutectic percentage ratio. The glaze 618 may have been formed from the coating 613 using any of the techniques described herein.

FIG. 6C illustrates an article 660 having a body 665 that is a glass ceramic. The article 600 may include multiple fluoride species. The percentages of the different fluoride species may be at the eutectic ratio percentage for those species.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the invention should be determined with reference to the appended claims, along with the full scope of equivalents to which such claims are entitled.

What is claimed is:

1. A method comprising:
   forming an article or a coating comprising an initial mixture comprising a first oxide and a second oxide;
   heating the article or coating to a treatment temperature of at least 910° C.;
   exposing the article or coating to anhydrous hydrogen fluoride gas at the treatment temperature of at least 910° C., wherein exposure of the article or coating to the anhydrous hydrogen fluoride gas at the temperature of at least 910° C. causes:
   replacement of oxygen molecules in the first oxide and the second oxide with fluorine molecules at a surface of the article or the coating;
   transformation of the initial mixture comprising the first oxide and the second oxide into a final mixture comprising a first fluoride and a second fluoride at the surface of the article or the coating;
   formation of a eutectic system from the final mixture, the eutectic system having a super-lattice of the first fluoride and the second fluoride at the surface of the article or the coating; and
   formation of a glaze from the eutectic system at the surface of the article or the coating.

2. The method of claim 1, wherein the glaze has a thickness of 0.5 to 200 microns.

3. The method of claim 1, wherein the formation of the eutectic system from the final mixture comprises:
   melting the first fluoride, wherein the first fluoride has a first melting temperature that is below the treatment temperature;
   dissolving the second fluoride by the melted first fluoride, wherein the second fluoride has a second melting temperature that is above the treatment temperature; and
   combining of the melted first fluoride and the dissolved second fluoride into the eutectic system, wherein the eutectic system has a third melting temperature that is below the first melting temperature.

4. The method of claim 1, wherein the first oxide is $ZrO_2$ and the second oxide is $Y_2O_3$.

5. The method of claim 1, wherein the initial mixture comprises a ceramic compound comprising $Y_4Al_2O_9$ and a solid-solution of $Y_2O_3$—$ZrO_2$, and wherein the exposure of the article or the coating to the anhydrous hydrogen fluoride gas at the temperature of at least 910° C. further causes Al to be removed from the ceramic compound at the surface of the article or the coating through formation and vaporization of $AlF_3$.

6. The method of claim 5, wherein the exposure of the article or coating to the anhydrous hydrogen fluoride gas at the temperature of at least 910° C. further causes vaporization of at least one of trace transition metals or aluminum from the surface of the article or the coating.

7. The method of claim 5, wherein the first oxide and the second oxide are selected from a group consisting of $Y_2O_3$, $Nd_2O_3$, $La_2O_3$, $Er_2O_3$, $Sc_2O_3$, $TiO_2$, $ZrO_2$, $HfO_2$, $Al_2O_3$ and $SiO_2$.

8. The method of claim 5, wherein the article comprises a sintered ceramic article.

9. The method of claim 5, further comprising:
   forming the coating on an object by performing one of dip coating, doctor blade coating, thermal spray coating, plasma spray coating, ion assisted deposition, or physical vapor deposition.

10. The method of claim 1, wherein the 50-100% of a thickness of the coating is converted to the glaze.

11. The method of claim 1, wherein the initial mixture comprises the first oxide, the second oxide and a third oxide, the final mixture comprises the first fluoride and the second fluoride and a third fluoride at the surface of the article or the coating, and the eutectic system has a super-lattice of the first fluoride, the second fluoride and the third fluoride at the surface of the article or the coating.

* * * * *